July 17, 1928.
L. L. BARR
1,677,613
LICENSE PLATE AND METHOD OF DISPLAYING THE SAME
Filed Aug. 18, 1927   2 Sheets-Sheet 1
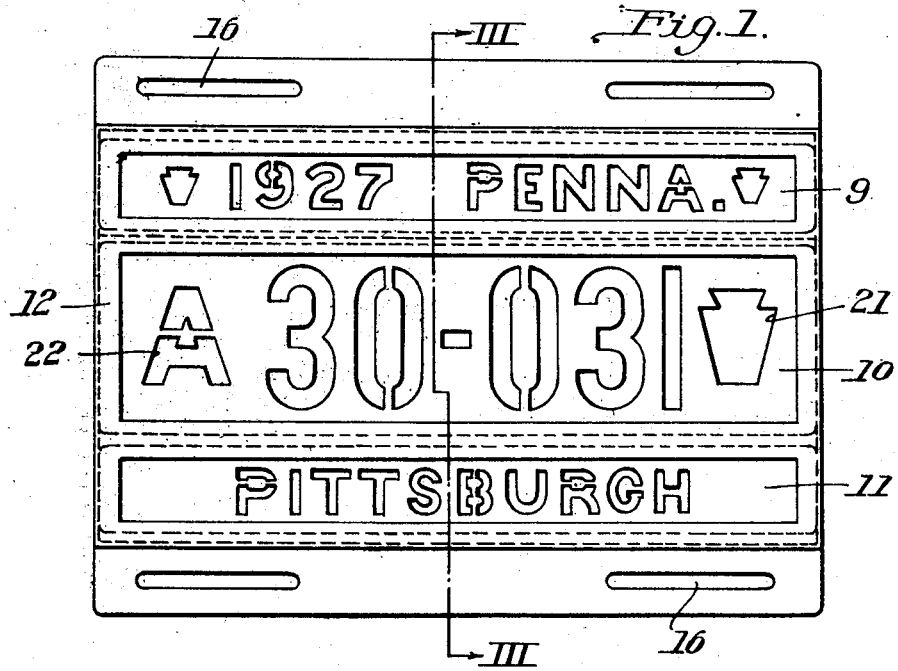
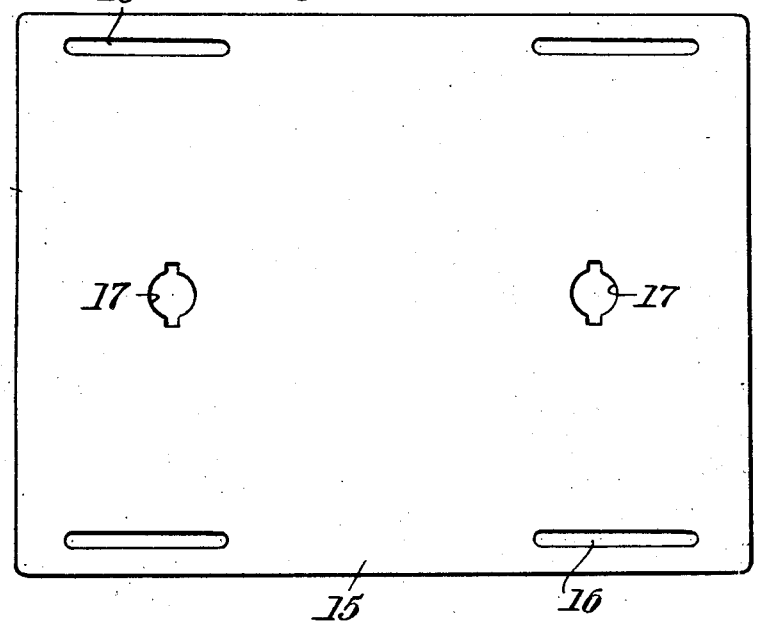
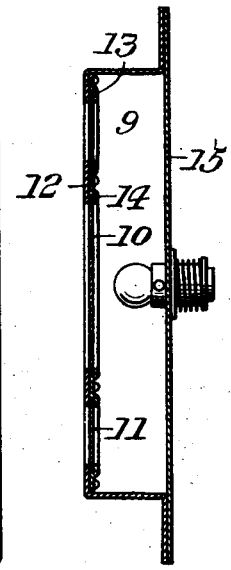
INVENTOR
Louis L. Barr,
by Archur H. Martin
atty July 17, 1928.
L. L. BARR
1,677,613
LICENSE PLATE AND METHOD OF DISPLAYING THE SAME
Filed Aug. 18, 1927    2 Sheets-Sheet 2
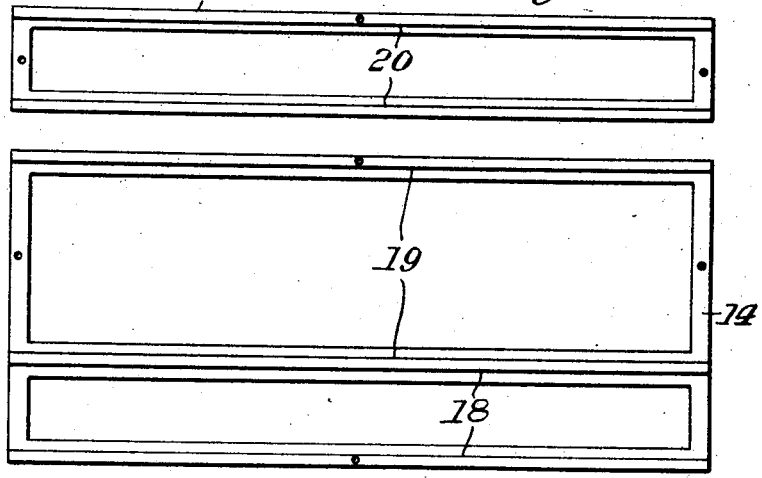
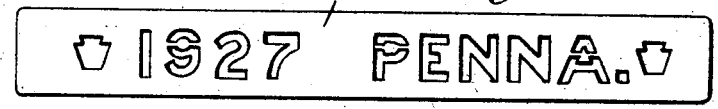
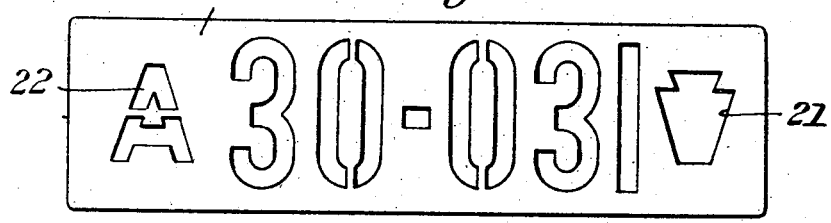
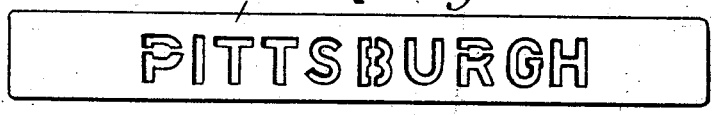
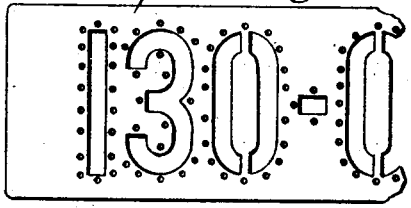
INVENTOR
Louis L. Barr
by Ashworth Martin
atty Patented July 17, 1928.

1,677,613

UNITED STATES PATENT OFFICE.

LOUIS L. BARR, OF PITTSBURGH, PENNSYLVANIA.

LICENSE PLATE AND METHOD OF DISPLAYING THE SAME.

Application filed August 18, 1927. Serial No. 213,811.

My invention relates to signs and methods of displaying the same, and is particularly suitable for use in connection with the license tags of motor vehicles.

My invention has for one of its objects the provision of a method whereby a number or a letter may not be readily changed without the alteration being apparent.

Another object of my invention is to provide a method whereby additional letters or numerals cannot be readily applied to a sign without detection.

Another object of my invention is to provide a method whereby the owner of an automobile may retain a license plate having a given number, from year to year, provision being made for indicating whether the license has been renewed in any current year.

Still another object of my invention is to simplify and improve generally the method and means for displaying license insignia on motor vehicles.

One manner in which my invention may be practised is shown in the accompanying drawing, wherein Figure 1 is a face view of an apparatus disclosing my invention; Fig. 2 is a rear view thereof; Fig. 3 is a view taken on the line III—III of Fig. 1; Fig. 4 is a view of the tag-holding plates which I employ in connection with the device of Fig. 1; Figs. 5, 6 and 7 are views of the tags or insignia plates themselves, and Fig. 8 is a fragmentary view showing a modification of a portion of the apparatus of Fig. 1, with means for preventing alteration of the numerals.

In the present case, I have shown three tags or insignia plates, designated by the numerals 9, 10 and 11 (Figs. 5, 6 and 7), whose letters and numerals are of stencil-like form, or cut-out, so that when a light is placed to the rear thereof, the insignia will be visible to one standing at the front. It will be understood that these plates could also be made of other material, such as celluloid or glass, having suitable portions thereof transparent in order to produce the desired numbering and lettering.

The plates 9, 10 and 11 are disposed against the inner wall of a casing 12 opposite to openings in such wall, as shown in Figs. 1 and 3. These insignia plates are supported in position by holding plates 13 and 14, the plates 13 and 14 being separately attached to the casing 12 by means of screws or bolts. The plate 13 is provided with an opening so as not to obstruct access of light to the rear side of the insignia plate 9, and the holding plate 14 is similarly provided with openings opposite to the tags 10 and 11. The casing 12 lies against a base plate 15, they being each provided with slot-like openings 16 by means of which they may be attached to the usual license plate bracket of an automobile (not shown). Lamp sockets 17 are provided in the base plate 15 to permit illumination of the interior of the casing 12, thus rendering the letters and numbers clearly visible, particularly at night.

While the plate 11 may be dispensed with, I consider it of some importance in that it will permit a vehicle to be more readily identified in case of accidents, etc., particularly where only a portion of the number has been noted or a slight error made in the notation thereof. The plate 10 containing the number is intended to remain in the hands of the vehicle owner at least so long as he shall retain the car for which it was originally secured, the owner being supplied with the year tag 9 upon payment of the annual license fee.

This method will avoid a large amount of work and expense in connection with the changing of the records at license headquarters each year and the issuing of numbered tags upon each renewal of license by a vehicle owner. Since the lettering and numbering are preferably in the form of stencils, the tags will have a long life, because there is no paint or enamel to become worn off or obliterated.

The tag-holding plate 14 will ordinarily be permanently held in place and is provided with ribs 18 between which the plate 11 lies and by which it is vertically supported. The plate 14 is provided with ribs 19 for affording vertical support to the horizontal edges of the tag 10, while the plate 13 is similarly provided with ribs 20 for supporting the tag 9. The illumination through the stenciling can be suitably colored, if desired, by interposing colored isinglass between the lamps and the stenciled plates.

In order to prevent alteration of the number on the plate 10 for instance, I have shown a character 21 cut out at one end thereof and a letter 22 cut out of the other end, it being understood that various other forms of insignia could be so used and that the idea is applicable also to plates whereon the numbers and other insignia are simply embossed or imprinted.

As a means for preventing alteration of the outline, or disfiguration, of a numeral to change it from one to another, as for instance extending the upper end of the numeral 3 to make a numeral 9, etc., I show in Fig. 8 a series of dots or circular perforations outlining each numeral, so that if a numeral were altered, the absence of the defining dots would indicate that a change had been made therein.

While in the appended claim, I refer to the insignia as "numbers", it will be understood that such term is intended to embrace also letters or characters of any other form.

I claim as my invention:—

Apparatus for displaying license tags comprising a base plate having holes for the reception of attaching members, a casing of box-like form open at one side, means for securing said open side to the base plate, that wall of the casing opposite to said opening having three vertically-spaced cut-out portions, a frame having two openings opposite to two of said cut-out portions, a frame having an opening opposite to the other of said cut-out portions, an upper and a lower marginal flange on the last-named frame, for engaging the edges of a license plate, upper, lower and intermediate flanges on the first-named frame for engaging the edges of two license plates and supporting them in vertically-spaced relation, and means for separately connecting said frames to the casing.

In testimony whereof I the said LOUIS L. BARR have hereunto set my hand.

LOUIS L. BARR.